United States Patent
Yu et al.

(10) Patent No.: US 10,878,243 B2
(45) Date of Patent: Dec. 29, 2020

(54) METHOD, DEVICE AND APPARATUS FOR GENERATING ELECTRONIC MAP, STORAGE MEDIUM, AND ACQUISITION ENTITY

(71) Applicant: BAIDU ONLINE NETWORK TECHNOLOGY (BEIJING) CO., LTD., Beijing (CN)

(72) Inventors: Li Yu, Beijing (CN); Shiyu Song, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/518,801

(22) Filed: Jul. 22, 2019

(65) Prior Publication Data

US 2020/0026925 A1 Jan. 23, 2020

(30) Foreign Application Priority Data

Jul. 23, 2018 (CN) .......................... 2018 1 0811490

(51) Int. Cl.
| | | |
|---|---|---|
| *G06K 9/00* | (2006.01) | |
| *G06K 9/32* | (2006.01) | |
| *G06T 17/20* | (2006.01) | |
| *G06T 19/00* | (2011.01) | |

(52) U.S. Cl.
CPC ..... *G06K 9/00697* (2013.01); *G06K 9/00637* (2013.01); *G06K 9/00651* (2013.01); *G06K 9/00657* (2013.01); *G06K 9/00791* (2013.01); *G06K 9/3208* (2013.01); *G06K 9/3233* (2013.01)

(58) Field of Classification Search
CPC .......... G06K 9/00697; G06K 9/00637; G06K 9/00651; G06K 9/00657; G06K 9/00791; G06K 9/3208; G06K 9/3233; G06K 9/00805; G06T 2207/30261
See application file for complete search history.

(56) References Cited

U.S. PATENT DOCUMENTS

| | | | |
|---|---|---|---|
| 10,043,076 | B1 * | 8/2018 | Zhang ....................... G06T 7/74 |
| 2017/0140578 | A1 * | 5/2017 | Xiao ..................... G06T 3/4038 |
| 2017/0148155 | A1 * | 5/2017 | Wei ............................ G06T 7/73 |
| 2018/0188043 | A1 * | 7/2018 | Chen ..................... G06K 9/6212 |
| 2019/0035150 | A1 * | 1/2019 | Owechko ................ G06T 15/08 |
| 2019/0236381 | A1 * | 8/2019 | Rochan Meganathan ................... G06K 9/00201 |
| 2019/0370565 | A1 * | 12/2019 | Shen ..................... G01S 17/931 |
| 2020/0011668 | A1 * | 1/2020 | Derhy ................... G06K 9/6211 |
| 2020/0025935 | A1 * | 1/2020 | Liang ..................... G06K 9/629 |
| 2020/0074658 | A1 * | 3/2020 | Yu .......................... G06T 7/557 |

* cited by examiner

*Primary Examiner* — Alexander Gee
(74) *Attorney, Agent, or Firm* — Lathrop GPM LLP (57) ABSTRACT

Embodiments of the present disclosure provide a method and a device for generating an electronic map, an electronic device, a computer readable storage medium, and an acquisition entity. The method includes: obtaining a first point cloud sequence and a second point cloud sequence for a preset region; generating a first grid map for the first point cloud sequence and a second grid map for the second point cloud sequence, wherein a grid in each of the first grid map and the second grid map at least comprises reflection value information of a point cloud; and optimizing the first point cloud sequence based on the first grid map and the second grid map.

17 Claims, 5 Drawing Sheets

Fig. 6 x, y search range : [-10m, 10m]  
x, y transformation unit: 0.5m  
yaw search range: [-2°, 2°]  
yaw transformation unit: 0.2°

Fig. 7A x, y search range: [-2m, 2m]  
x, y transformation unit: 0.25m  
yaw search range: [-0.4°, 0.4°]  
yaw transformation unit: 0.05°

Fig. 7B x, y search range: [-0.5m, 0.5m]  
x, y transformation unit: 0.125m  
yaw search range: [-0.1°, 0.1°]  
yaw transformation unit: 0.025°

METHOD, DEVICE AND APPARATUS FOR GENERATING ELECTRONIC MAP, STORAGE MEDIUM, AND ACQUISITION ENTITY

CROSS-REFERENCE TO RELATED APPLICATIONS

This application claims priority to and the benefit of Chinese Patent Application No. 201810811490.1, filed with the National Intellectual Property Administration of P. R. China on Jul. 23, 2018, the entire contents of which are incorporated herein by reference.

TECHNICAL FIELD

Embodiments of the present disclosure generally relate to the field of computer technologies, and more particularly, to a method for generating an electronic map, a device for generating an electronic map, an electronic device, a computer readable storage medium, and an acquisition entity.

BACKGROUND

An electronic map refers to a map in digital form generated by computing technology, which can be widely used in scenes such as query, positioning and navigation, among others. The electronic map generally includes an ordinary navigation map and a high-precision map. The ordinary navigation map is a user-oriented map that can provide a visual interface for users to query and display. The high-precision map is a machine-oriented map data that can be used, for example, for automatic driving, robot navigation and positioning. The ordinary navigation map is usually obtained by satellite mapping, and its accuracy is low (for example, the error may reach several meters or even tens of meters). The high-precision map has a high accuracy, and includes information that can be used for precise navigation and positioning, such as lane line information, object height information, road shape information, etc.

Generally, the high-precision map is constructed by collecting point cloud data through lidar, when the pose of the lidar is not accurately obtained, the generated high-precision map will be inaccurate.

SUMMARY

According to a first aspect of the present disclosure, there is provided a method for generating an electronic map. The method includes: obtaining a first point cloud sequence and a second point cloud sequence for a preset region; generating a first grid map for the first point cloud sequence and a second grid map for the second point cloud sequence, in which a grid in each of the first grid map and the second grid map at least includes reflection value information of a point cloud; and optimizing the first point cloud sequence based on the first grid map and the second grid map.

According to a second aspect of the present disclosure, there is provided an electronic device. The electronic device includes one or more processors, and a memory configured to store one or more programs. When the one or more programs are executed by the one or more processors, causes the one or more processors to perform the method or acts according to an embodiment of the present disclosure.

According to a third aspect of the present disclosure, there is provided a computer readable storage medium having stored thereon computer programs that, when executed by a processor, causes the method or acts according to an embodiment of the present disclosure to be implemented.

According to a fourth aspect of the present disclosure, there is provided an acquisition entity, which includes the electronic device according to an embodiment of the present disclosure.

It is to be understood that both the foregoing general description and the following detailed description are exemplary and explanatory only and are not restrictive of the present disclosure. Other features of the present disclosure will be understood by the following description.

BRIEF DESCRIPTION OF THE DRAWINGS

These and other aspects and advantages of embodiments of the present disclosure will become apparent and more readily appreciated from the following descriptions made with reference to the accompanying drawings. In the drawings, the same or similar reference numerals indicate the same or similar elements, in which.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

In the description of the embodiments of the present disclosure, the term "including" and the like should be understood as open inclusion, i.e., "including but not limited to". The term "based on" should be understood as "based at least in part on". The term "one embodiment" or "the embodiment" should be understood as "at least one embodiment". The term "pose" may include position and attitude. Other explicit and implicit definitions may also be included below.

Generally, for large-scale urban three-dimensional (3D) map construction, multiple acquisition devices, multiple acquisition paths, multiple days, and multi-bitch point cloud registration may be required. For such large amount of point cloud data, when the initial attitude is inaccurate, the derivative algorithm in the related art may usually have large cumulative error and low efficiency. Since the weak positioning system may cause a large error (possibly reaching a position error of several meters, and/or an attitude angle error for a few degrees) in the initial pose of the lidar, the derivative algorithm in the related art may not get the correct point cloud registration result in the scene of the weak positioning system.

In the related art, it mainly relies on the high-precision global positioning results provided by the Global Navigation Satellite System/Sinus Inertial Navigation System (GNSS/SINS) to construct the map, the system can provide centimeter-level accuracy in open scenes such as highways, in the scene such as urban skyscrapers or tunnels, weak or missing positioning signals may make the system inoperable. In the case where the signal of the geographic positioning system is weak or missing, there may be two map construction solutions. One solution is to obtain 3D coordinates of the laser scanner based on wire control measurement and in combination with 3D laser scanner and wire control measurement technology, solve the attitude of each laser scanner through the point cloud matching algorithm, and restore the 3D scene by point cloud registration of the multiple scanners. However, since wire measurement and scanning are time consuming, it is difficult to implement on open roads. Another solution is to estimate the position and attitude of the onboard lidar relative to the initial position by frame-by-frame point cloud/image matching and based on simultaneous localization and mapping (SLAM). However, the pose of the radar is derived frame by frame through the point cloud matching between frames, and the error may increase with the increase of the distance. There may also be large deviations in the same place multiple times, which cannot meet the high precision requirement.

Accordingly, embodiments of the present disclosure provide a solution for generating an electronic map. A plurality of point cloud sequences for the same region are obtained, the plurality of point cloud sequences are transformed into a plurality of grid maps and matching is performed, to optimize the point cloud sequence, such that the point cloud map having the high precision can be constructed. The method according to an embodiment of the present disclosure may have performances such as high precision, high robustness. In addition, with an embodiment of the present disclosure, the map can be constructed in scenes such as high-rise buildings, tunnels, and the like. The high-precision map reconstruction in the case of weak or missing geolocation system signals can be achieved by optimization of single-turn on-board lidar data and matching of multi-turn based on reflection values. Embodiments of the present disclosure will be described in detail below with reference to FIGS. 1-8.

Figure 1:
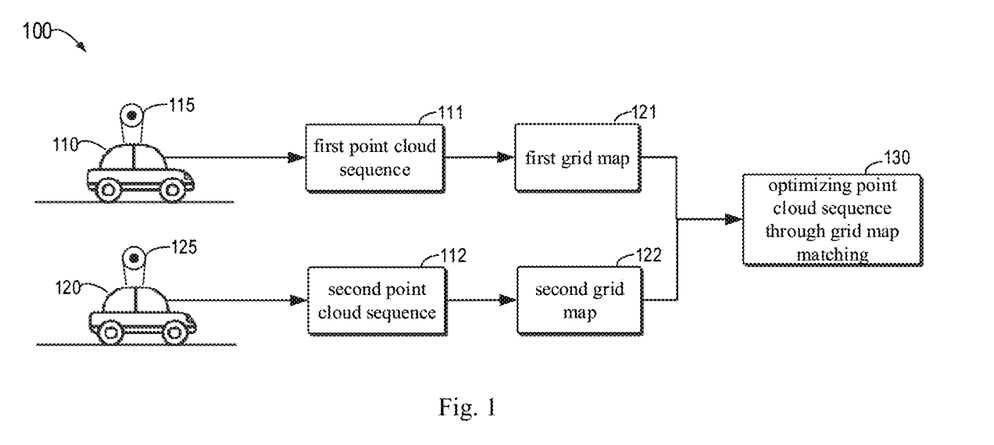
FIG. 1 is a schematic diagram of an environment in which an embodiment of the present disclosure is implemented.

FIG. 1 is a schematic diagram of an environment 100 in which an embodiment of the present disclosure is implemented. The exemplary environment 100 may be used to generate the high-precision point cloud map. As illustrated in FIG. 1, the exemplary environment 100 includes the acquisition entities 110 and 120 traveling on the road, a lidar 115 of the acquisition entity 110, and a lidar 125 of the acquisition entity 120.

Each of the acquisition entity 110 and 120 may be a driving system, such as an automatic driving system or a non-automatic driving system. The driving system may be a general personal vehicle, a dedicated acquisition vehicle, or any other suitable vehicle. In the following, embodiments of the present disclosure may be discussed with the vehicle as an example, it should be understood that, the present disclosure may be similarly applied to other types of acquisition entities. It should be noted that, the "acquisition entity" herein may refer to a carrier that collects the point cloud by means of the lidar, and may or may not include the lidar itself. In an embodiment of the present disclosure, the "lidar of the acquisition entity" may be fixed on the acquisition entity, for example, arranged on or in the acquisition entity in a fixed manner. Alternatively, the "lidar of the acquisition entity" may be arranged on the acquisition entity in a non-fixed manner.

As shown in FIG. 1, the acquisition entity 110 is traveling on the road, and the lidar 115 can acquire point cloud data of the road and its surrounding environment during the movement of the acquisition entity 110. It should be understood that, the point cloud data of the road may be acquired in accordance with a predetermined route and/or a preset acquisition cycle, certainly, the acquisition route and/or acquisition cycle may also be determined by the driver. The "lidar" herein may refer to a radar device that detects the position and/or velocity of a target by transmitting the laser beam. The working principle of the lidar is to transmit a detection signal (laser beam) to the target, compare the received signal (target echo) reflected from the target with the transmitted signal, and obtain relevant information (such as one or more of parameters such as target distance, azimuth, altitude, velocity, attitude, and shape) of the target after corresponding processing. The point cloud data may be generated based on the data acquired by the lidar. The point cloud may refer to the collection of massive points with features of the surface of the target (such as road and surrounding environment).

In an embodiment, while acquiring the point cloud, the lidar 115 may measure 3D coordinates of the object in the environment by utilizing the Global Positioning System (GPS) and the Inertial Measurement Unit (IMU). In addition, the positioning system may not be limited to GPS, the Galileo satellite positioning system in Europe, the Beidou satellite positioning system in China, etc., may also be utilized in combination with the embodiments of the present disclosure. In an embodiment of the present disclosure, the precision of the initial pose of the lidar obtained by GPS and IMU may be low, by analysis, the road segment with a high reliability (high GPS signal strength, and high precision) and the road segment with a low reliability (low GPS signal strength, and large error) can be obtained, and poses of the two cases may be processed dependently. For the road segment having strong signal, the accurately measured pose can be used as the pose of the lidar, for the road segment having weak signal, local smoothing may be achieved by SLAM based on features extracted. In addition, the pose of strong signal and the pose of weak signal can be combined to obtain the optimized pose, and the point cloud can be optimized based on the pose.

Referring to FIG. 1, the lidar 115 acquires the point cloud data of the road to obtain the first point cloud sequence 111, and the first point cloud sequence 111 can be transformed to the first grid map 121 by projection. The grid map includes a plurality of grids, and the attribute of each grid may include data of the point cloud in the grid. For example, when a laser beam is irradiated onto a target surface, the reflected laser may carry information such as azimuth, distance, and the reflection value. When the laser beam is scanned according to a preset trajectory, the reflected laser point information may be recorded while scanning, and since the scanning is fine, a large number of laser points can be obtained, thereby forming the point cloud.

The lidar 125 may acquire point cloud data associated with the same road. For example, the acquisition entity 110 and the acquisition entity 120 may be different, and they can perform laser acquisition on the same region or the same road, respectively. The acquisition entity 120 obtains the second point cloud sequence 112 through the lidar 125, and the second point cloud sequence 112 can be transformed to the second grid map 122 by projection. It should be understood that, although FIG. 1 illustrates the utilization of different acquisition entities to perform acquisition on the same region or road, it may also use the same acquisition entity to perform multiple acquisitions on the same region or road at different times, so as to obtain a plurality of point cloud sequences for the same region.

Referring to FIG. 1, at block 130, the point cloud sequence (e.g., point cloud sequence 111 and/or point cloud sequence 112) may be optimized by matching first grid map 121 and second grid map 122. Exemplary embodiments of optimizing point cloud sequences based on grid map matching may be described in detail below with reference to FIG. 2-FIG. 8.

Figure 2:
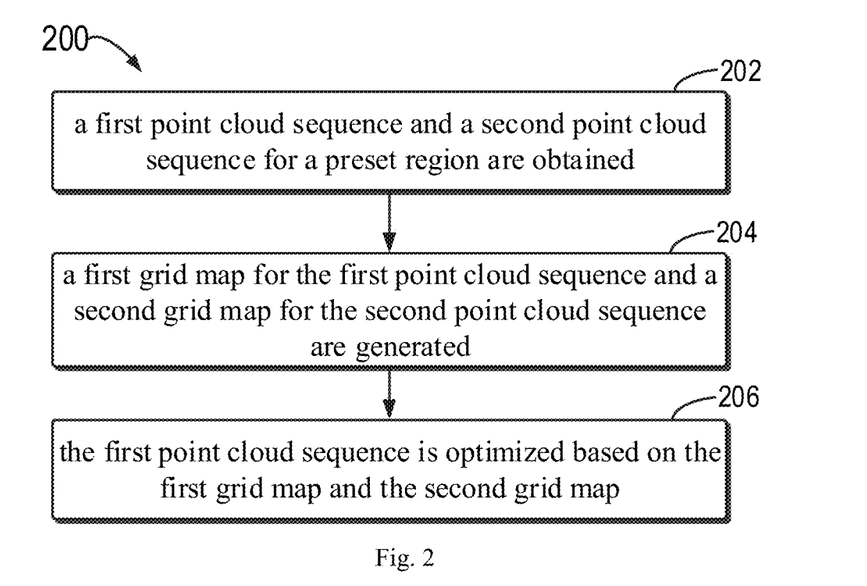
FIG. 2 is a flow chart of a method for generating an electronic map according to an embodiment of the present disclosure.

FIG. 2 is a flow chart of a method 200 for generating an electronic map according to an embodiment of the present disclosure. For convenience of description, embodiments of the present disclosure will be described below with reference to the environment 100 shown in FIG. 1. It should be understood that, the environment 100 illustrated in FIG. 1 is merely an example, and cannot be intended to limit the scope of the embodiments of the present disclosure.

At block 202, a first point cloud sequence and a second point cloud sequence for a preset region are obtained.

For example, the first point cloud sequence 111 may be obtained by the acquisition entity 110, and the second point cloud sequence 112 may be obtained by the collection entity 120. In an embodiment, the first point cloud sequence and the second point cloud sequence may be obtained when a signal of the geolocation system is weak or missing. In an embodiment, a 2D projection region (referred to as "map_node") may be partitioned. For example, a series of 2D rectangular regions may be automatically divided according to a chronological order of acquisition trajectories, and each region may cover a preset range, e.g., 128 m×128 m region, the size is not limited herein.

At block 204, a first grid map for the first point cloud sequence and a second grid map for the second point cloud sequence are generated.

A grid in each of the first grid map and the second grid map at least includes reflection value information of a point cloud. For example, the first grid map 121 may be generated based on the first point cloud sequence 111, and the second grid map 122 may be generated based on the second point cloud sequence 112. Each region covers a continuous pose sequence over a period of time, and the laser point cloud corresponding to the pose sequence may be projected onto a global coordinate system, and a grid map with the resolution of 0.125 m can be generated according to the laser reflection value. For example, the grid map may include 1024×1024 grids (also referred to as "pixel"), and each grid having a size of 0.125 m×0.125 m.

For example, the coordinates of the laser point cloud sequence may be transformed and projected into the same map_node to generate the first grid map and the second grid map. In the driving process, the acquisition entity may continuously scan the surrounding environment through the lidar to generate the point cloud data. Focusing on the lidar, the scanned point cloud data may be transformed from an acquisition entity coordinate system to a world coordinate system. For example, X is a 3D point in the point cloud, it may be transformed into a point X' in the world coordinate system by formula (1).

$$X'=RX+T \tag{1}$$

where R represents a rotation matrix from the acquisition entity coordinate system to the world coordinate system, T represents the translation matrix from the acquisition entity coordinate system to the world coordinate system.

By formula (2), point X' may be projected into the map_node to generate point X''.

$$X''=SX' \tag{2}$$

where S represents a projection matrix.

Since the point cloud data of the laser includes a large number of laser points, when all of them are stored in the grid map, the data quantity may be large, and the matching efficiency may be low. In some embodiments, each map_node may be divided into a predetermined number (e.g., 1024×1024) of grids (i.e., map_cells), and the point cloud data in each grid may be aggregated. The grid of the laser point may be determined based on its coordinates. Then, the number of laser points in the grid, the mean value and variance of reflection values of the laser points, and the mean value and variance of height values of the laser points may be stored. In this manner, the aggregated data may be stored in each grid, such that the data quantity in each grid map is fixed regardless of the number of laser points, the storage efficiency and matching efficiency can be optimized. In some embodiments, each grid may store laser reflection value information only, without height value information.

At block 206, the first point cloud sequence is optimized based on the first grid map and the second grid map.

For example, a plurality of grid maps generated for the same region may be paired, and geometric transformation and matching can be performed for each pair. For example, in the process of matching the first grid map and the second grid map, the second grid map may be set as the target, and the first grid map may be set as the source, the second grid map needs to be fixed to optimize the first grid map. An example implementation of optimizing the point cloud sequence by grid map matching is further described below with reference to FIG. 6.

Thus, with the method 200 according to an embodiment of the present disclosure, by matching the plurality of point cloud sequences for the same region, the point cloud sequence can be optimized to construct the high-precision point cloud map. Moreover, the method 200 according to an embodiment of the present disclosure is still capable of generating the high-precision point cloud map in the case where the signal of the geolocation system is weak or missing, thereby expanding the applicable scenario of unmanned driving.

Figure 3:
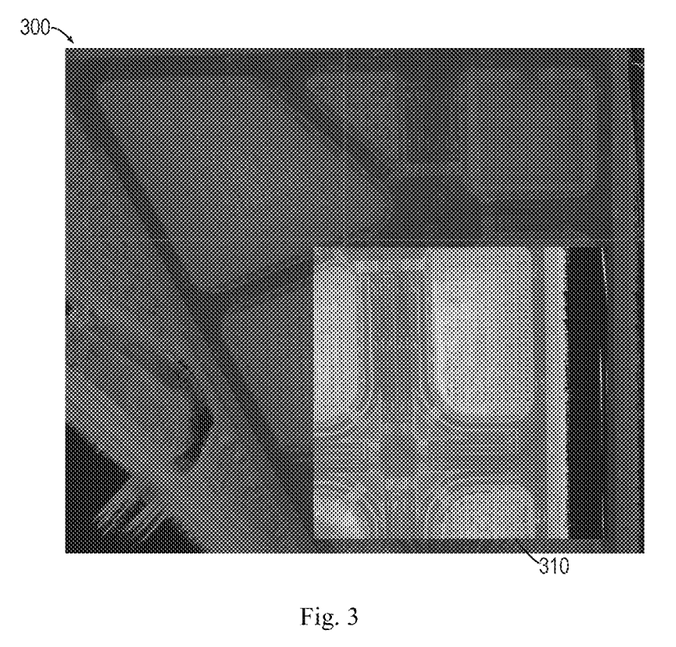
FIG. 3 is a schematic diagram of a reflection value map projected onto a two-dimensional (2D) region according to an embodiment of the present disclosure.

FIG. 3 is a schematic diagram of a reflection value map 300 projected onto a 2D region according to an embodiment of the present disclosure. The reflection value map is a 2D picture, which may include reflection value information (for example, RGB value) of each pixel and height information (z value) of the ground where the pixel is located. According to an embodiment of the present disclosure, each pixel in the reflection value map has an attribute of height value. The map 300 is an example of a reflection value map projected onto a 2D region, which is a bird's-eye view of the road, where 310 indicates an example of a 2D rectangular region having a predetermined size.

Figure 4:
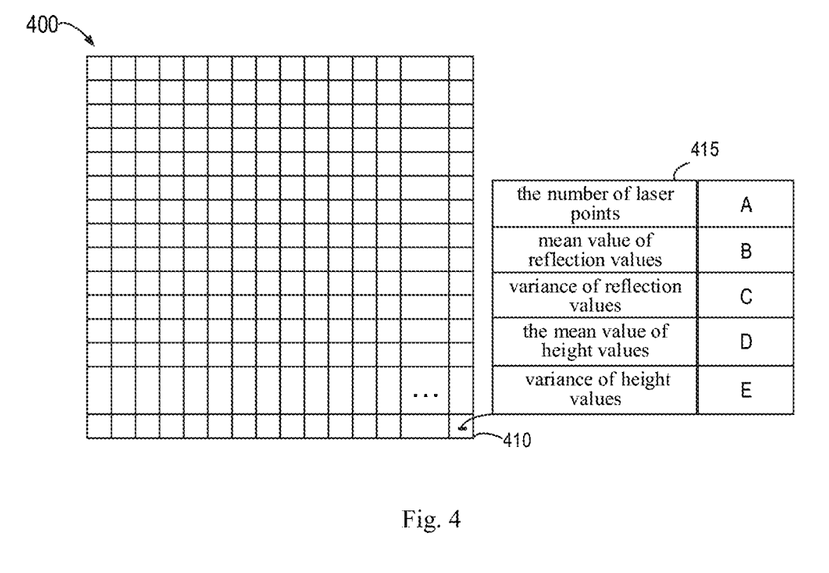
FIG. 4 is a schematic diagram of a grid map according to an embodiment of the present disclosure.

FIG. 4 shows a schematic diagram of a grid map 400 according to an embodiment of the present disclosure. For example, the grid map 400 may cover a preset range (such as 128 m×128 m, other sizes may also be possible). The grid map 400 may be divided into a predetermined number (such as 1024×1024) of grids (e.g., grid 410), i.e., each grid has a size of 0.125 m×0.125 m. As shown in FIG. 4, the grid 410 includes the attribute 415 which may include the number of laser points in the grid 410, the mean value and variance of reflection values of laser points, and the mean value and variance of height values of laser points. In some embodiments, the point cloud sequence may be projected into a plurality of grids in the grid map, the point cloud data in each grid may be aggregated, and then the attributes of each grid in the grid map may be stored.

Figure 5:
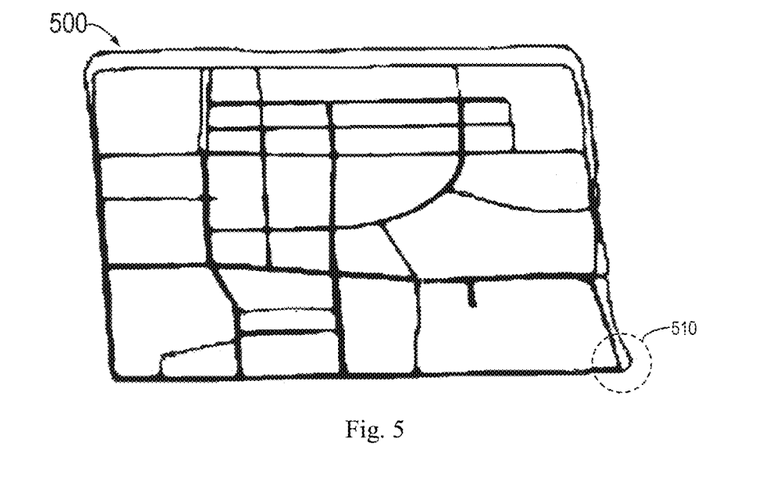
FIG. 5 is a schematic diagram of performing multiple acquisitions on a same region according to an embodiment of the present disclosure.

FIG. 5 is a schematic diagram 500 of performing multiple acquisitions on a same region according to an embodiment of the present disclosure. As shown in FIG. 5, multiple laser acquisitions are performed for the same region. For example, the road in circle 510 is acquired five times, a plurality of point cloud sequences that are not identical are obtained. In an embodiment, a plurality of point cloud sequences for the same 2D rectangular region map_node are paired, each pair is matched, and $C_n^2$ pairs can be generated, where n is the number of acquisitions of the same region. For example, it is assumed that five acquisitions are performed for a region, five grid maps can be generated. The difference between the five grid maps lies in that the attribute recorded in each grid is different. The five grids are paired, with a total of 10 pairs, and the two grids in each pair can be matched to optimize the point cloud sequence.

Figure 6:
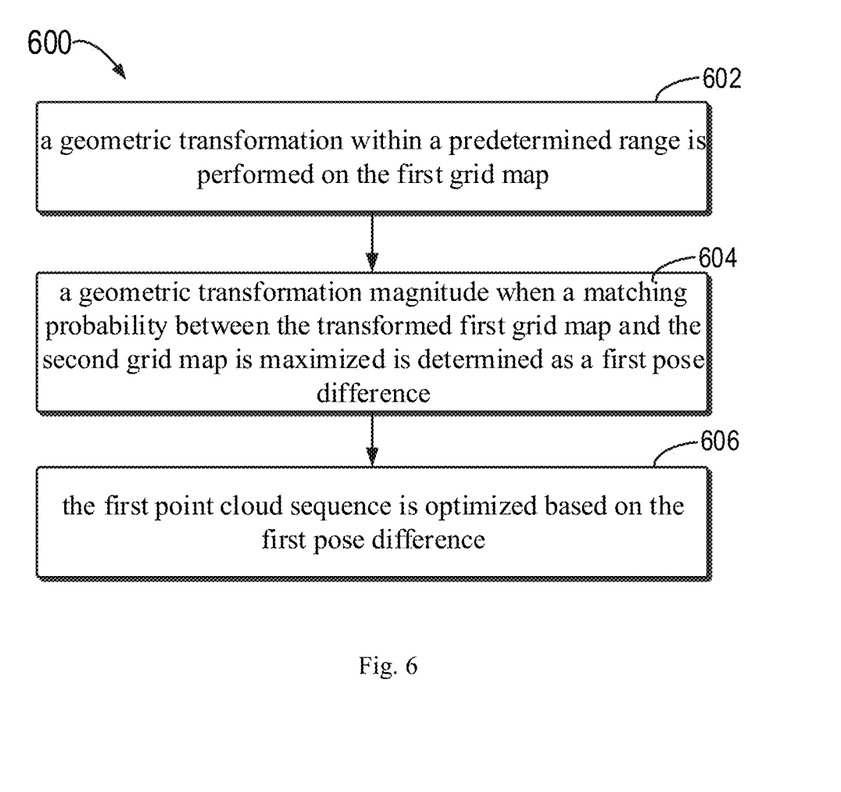
FIG. 6 is a flow chart of a method for optimizing a point cloud sequence according to an embodiment of the present disclosure.

FIG. 6 is a flow chart of a method 600 for optimizing a point cloud sequence according to an embodiment of the present disclosure. The method 600 may be an exemplary implementation of block 206 described above with reference to FIG. 2. For the matching between a pair of grid maps (i.e., the first grid map and the second grid map), the second grid map may be set as the target, the first grid map may be set as the source, and the second grid map may be fixed to optimize the first grid map.

At block 602, a geometric transformation within a predetermined range is performed on the first grid map.

The geometric transformation includes at least one of translation and rotation. For example, the grids in the two grid maps may be coincided in a certain range after the initial pose being projected together. In the initial state, the center of the first grid map may coincide with the center of the second grid map.

At block 604, a geometric transformation magnitude when a matching probability between the transformed first grid map and the second grid map is maximized is determined as a first pose difference.

For example, when the first grid map is transformed within the predetermined range, the matching probability between the transformed first grid map and the second grid map may be calculated, and when the matching probability is maximized, it is the best matching position of the first grid map and the second grid map. It is assumed that the center of the transformed first grid map coincides with grid (x, y) in the second grid map, the matching probability between the first grid map and the second grid map may be determined by a formula (3).

$$P(z \mid x, y) = \alpha \frac{\sum_{i,j} |\mu_{i-x,j-y}^m - \mu_{i,j}^r| \cdot N_{i,j}^r}{\sum_{i,j} N_{i,j}^r} \quad (3)$$

where z denotes a measurement value of a current frame, including all maps and online laser acquisition information. $\mu_{i,j}^r$ denotes the mean value of reflection values of grid (i, j) in the first grid map. $N_{i,j}^r$ denote the number of laser points of grid (i, j) in the first grid map. $\mu_{i-x,j-y}^m$ denotes the mean value of reflection values of the corresponding grid in the second grid map. α denotes a constant parameter. By the formula (3), the matching probability (the sum of matching probabilities between the corresponding grids) when the center of the first grid map coincides with each of all the grids (x, y) within the search range in the second grid map can be calculated.

In an embodiment, in addition to the reflection values, the matching of height values may be considered. For example, the joint matching probability of the reflection value and the height value between the two grid maps can be calculated by a formula (4).

$$P(z \mid x, y, m) = \eta \cdot P(z_r \mid x, y, m)^\gamma \cdot P(z_a \mid x, y, m)^{1-\gamma} \quad (4)$$

where $z_r$ denotes reflection value information, $z_a$ denotes height value information, η denotes an empirical value, γ denotes a weight, m denotes a map. The formula (4) represents the joint probability of the grid maps.

At block 606, the first point cloud sequence is optimized based on the first pose difference.

In an embodiment, the third grid map may be generated based on a third point cloud sequence for the preset region, a second pose difference between the second grid map and the third grid map can be determined, and a third pose difference between the third grid map and the first grid map can be determined.

After the pose difference between each pair of grid maps (e.g., pair1: $\Delta p_1$, pair2: $\Delta p_2$, . . . ), global pose map optimization can be performed. For example, each grid map may be abstracted as a node in the graph, the pose difference between the grid maps may be determined as the edge between the nodes, and the pose of each node needs to be optimized. As the constraint on two nodes in global optimization, an objective function (5) may be determined according to the constraint condition. With the priori pose constraint provided by GPS and IMU, a residual equation can be constructed, and the objective function can be minimized.

$$\{\Delta p\} \leftarrow \underset{\Delta p_{ijk}}{\operatorname{argmin}} \left\{ \sum_i \left\| (\Delta p_i \cdot x_i^2 - x_i^1)_{pair} + (\Delta \hat{p}_i \cdot x_i^2 - x_i^1)_{pair} \right\|^2 \right\} \quad (5)$$

where $\Delta p_i$ represents the pose difference of the $i^{th}$ pair, $\Delta \hat{p}_i$ represents the priori pose constraint of the $i^{th}$ pair, $X_i^1$ and $X_i^2$ represents the target pose and the source pose of the $i^{th}$ pair, respectively.

By minimizing the objective function, the final pose of each grid map can be obtained, and the pose of each grid map is the pose of the center point of the grid map. Then, the point cloud sequence points involved in the grid map can be adjusted based on the pose of the grid map, to optimize the point cloud sequence and generate the high-precision point cloud map.

In some embodiments, the two grid maps may be matched by coarse-to-fine matching. For example, geometric transformation may be performed on the first grid map in a first transformation unit in a first range, and then geometric transformation may be performed on the first grid map in a second transformation unit in a second range. The second range is less than the first range, and the second transformation unit is less than the first transformation unit. FIGS.

Figure 7A:
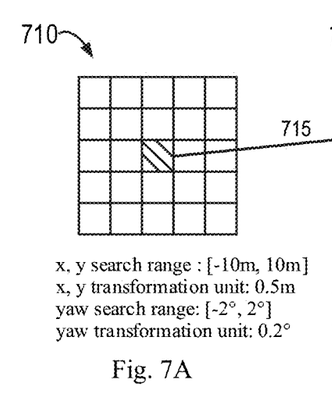
FIGS. 7A-7C are schematic diagrams illustrating a matching process from coarse to fine according to an embodiment of the present disclosure.
Figure 7B:
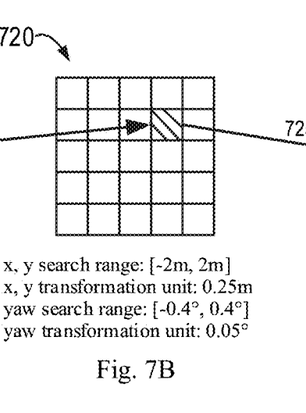
Figure 7C:
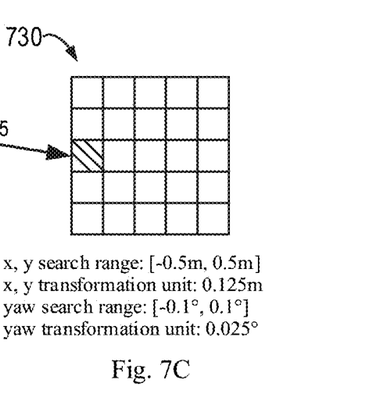

7A-7C illustrate a matching process 710-730 from coarse to fine according to an embodiment of the present disclosure, in which the search range is from large to small, and the matching accuracy is from coarse to fine. As shown in FIGS. 7A-7C, the three freedoms (x coordinate, y coordinate, and yaw angle (heading angle)) are transformed geometrically. FIGS. 7A-7C illustrate examples of three search matching from coarse to fine.

As shown in FIG. 7A, the geometric transformation is performed with a large search range and a large transformation unit (i.e., resolution). In FIG. 7A, the size of each grid is 0.5 m×0.5 m, the search range of x and y is ±10 m, the transformation unit of x and y is 0.5 m, and the search range of yaw angle is ±2°, the transformation unit of the yaw angle is 0.2°. In the process 710 of FIG. 7A, 41×41×21 iterations may be required.

After the coarse precision matching, as shown in FIG. 7B, the geometric transformation is performed with a smaller search range and a finer transformation unit. In FIG. 7B, the size of each lattice is 0.25 m×0.25 m, the search range of x and y is ±2 m, the transformation unit of x and y is 0.25 m, and the search range of yaw angle is ±0.4°, the transformation unit of yaw angle is 0.05°. In the process 720 of FIG. 7B, 17×17×17 iterations may be required.

As shown in FIG. 7C, the geometric transformation is performed with a smaller search range and a finer transformation unit. In FIG. 7C, the size of each grid is 0.125 m×0.125 m, the search range of x and y is ±0.5 m, the transformation unit of x and y is 0.125 m, and the search range of yaw angle is ±0.1°, the transformation unit of yaw angle is 0.025°. In the process 730 of FIG. 7C, 9×9×9 iterations may be required.

As indicated by arrows 715 and 725, FIGS. 7A-7C illustrate the coarse-to-fine matching, which can solve the problem of large deviation (e.g., greater than 5 m) between multiple point cloud sequences when the signal of the geolocation system is weak or missing. In addition, matching efficiency can be improved and the time of matching can be reduced.

Figure 8:
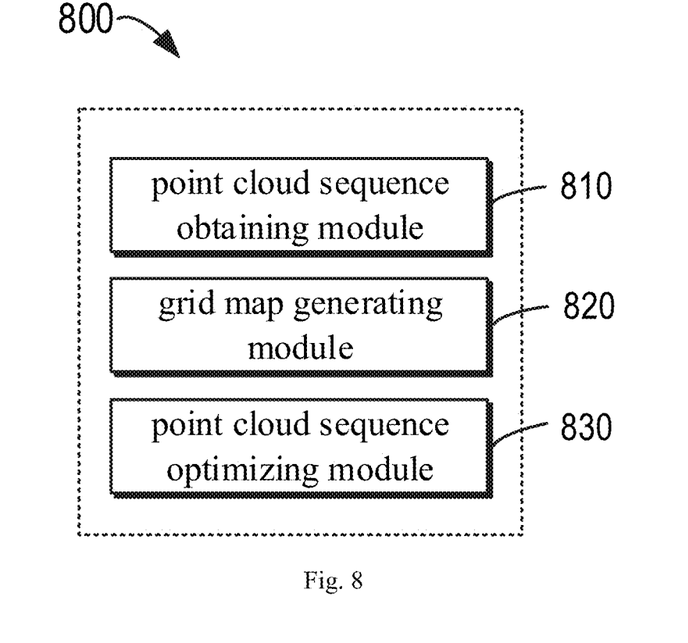
FIG. 8 is a block diagram of a device for generating an electronic map according to an embodiment of the present disclosure.

FIG. 8 is a block diagram of a device 800 for generating an electronic map according to an embodiment of the present disclosure. As shown in FIG. 8, the device 800 includes a point cloud sequence obtaining module 810, a grid map generating module 820, and a point cloud sequence optimizing module 830. The point cloud sequence obtaining module 810 is configured to obtain a first point cloud sequence and a second point cloud sequence for a preset region. The grid map generating module 820 is configured to generate a first grid map for the first point cloud sequence and a second grid map for the second point cloud sequence. A grid in each of the first grid map and the second grid map at least includes reflection value information of a point cloud. The point cloud sequence optimizing module 830 is configured to optimize the first point cloud sequence based on the first grid map and the second grid map.

In an embodiment, the point cloud sequence obtaining module 810 includes a point cloud obtaining module. The point cloud obtaining module is configured to obtain the first point cloud sequence and the second point cloud sequence when a signal of a geolocation system is weak or missing.

In an embodiment, the grid map generating module 820 includes a projecting module, an aggregating module, and a storing module. The projecting module is configured to project the first point cloud sequence into a plurality of grids in the first grid map. The aggregating module is configured to aggregate point cloud data in each of the plurality of grids. The storing module is configured to store an attribute of each of the plurality of grids in the first grid map. The attribute includes: a number of laser points, a mean value and variance of reflection values of the laser points, a mean value and variance of height values of the laser points.

In an embodiment, the point cloud sequence optimizing module 830 includes a geometric transformation module, a first pose difference determining module, and a point cloud optimizing module. The geometric transformation module is configured to perform a geometric transformation within a predetermined range on the first grid map. The geometric transformation includes at least one of translation and rotation. The first pose difference determining module is configured to determine a geometric transformation magnitude when a matching probability between the transformed first grid map and the second grid map is maximized as a first pose difference. The point cloud optimizing module is configured to optimize the first point cloud sequence based on the first pose difference.

In an embodiment, the geometric transformation module includes a first geometric transformation module, and a second geometric transformation module. The first geometric transformation module is configured to perform a first geometric transformation on the first grid map in a first transformation unit in a first range. The second geometric transformation module is configured to perform a second geometric transformation on the first grid map in a second transformation unit in a second range. The second range is less than the first range, and the second transformation unit is less than the first transformation unit.

In an embodiment, the first pose difference determining module includes a joint matching probability determining module, which is configured to determine a joint matching probability of a reflection value and a height value between the transformed first grid map and the second grid map.

In an embodiment, the point cloud sequence optimizing module 830 further includes a second grid map generating module, a second pose difference determining module, and a third pose difference determining module. The second grid map generating module is configured to generate a third grid map based on a third point cloud sequence for the preset region. The second pose difference determining module is configured to determine a second pose difference between the second grid map and the third grid map. The third pose difference determining module is configured to determine a third pose difference between the third grid map and the first grid map.

In an embodiment, the point cloud sequence optimizing module 830 further includes a pose determining module, and a point cloud sequence adjusting module. The pose determining module is configured to determine a first pose of the first grid map, a second pose of the second grid map and a third pose of the third grid map based on the first pose difference, the second pose difference and the third pose difference. The point cloud sequence adjusting module is configured to adjust the first point cloud sequence based on the first pose.

It should be understood that, the point cloud sequence obtaining module 810, the grid map generating module 820 and the point cloud sequence optimizing module 830 illustrated in FIG. 8 may be included in one or more electronic devices, and may also be included in the acquisition entity. Moreover, the modules illustrated in FIG. 8 may perform steps or acts in the method or the process of embodiments of the present disclosure.

Figure 9:
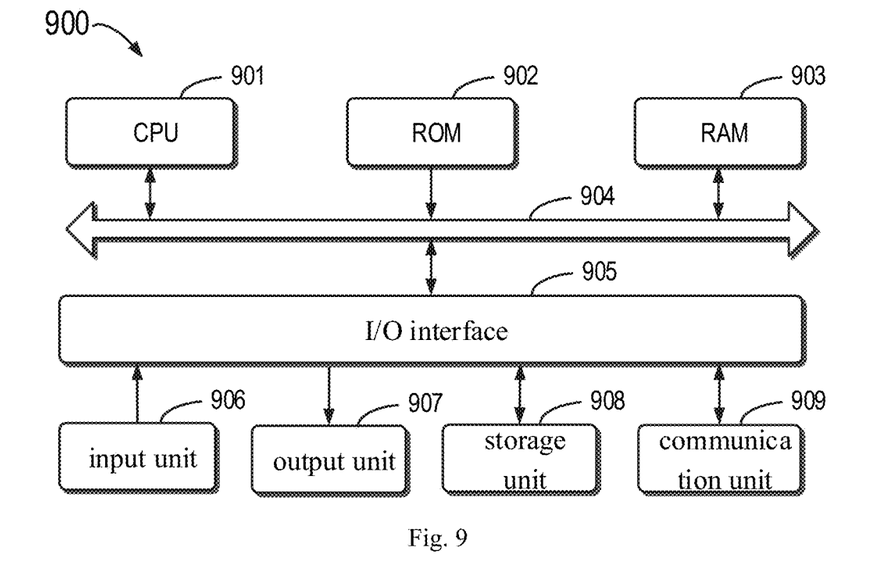
FIG. 9 is a block diagram of an electronic device capable of implementing an embodiment of the present disclosure.

FIG. 9 is a schematic diagram of a device 900 according to an embodiment of the present disclosure. The device 900 may be configured to implement the device 800 for generating an electronic device according to an embodiment of the present disclosure.

As shown in FIG. 9, the device 900 includes a central processing unit (CPU) 901, a read only memory (ROM) 902, and a random-access memory (RAM) 903. The CPU 901 can perform various appropriate operations and processes based on the computer program instructions stored in the ROM 902 or computer program instructions loaded from the storage unit 908 into the RAM 903. The RAM 903 may store various programs and data required for the operation of the device 900. The CPU 901, the ROM 902 and the RAM 903 may be connected to each other through a bus 904. The input/output (I/O) interface 905 may also be coupled to bus 904.

A plurality of components in the device 900 are coupled to the I/O interface 905, including: the input unit 906 such as a keyboard, mouse, etc., the output unit 907 such as various types of displays, speakers, etc., the storage unit 908 such as a disk, an optical disk or the like, and the communication unit 909 such as a network card, a modem, a wireless communication transceiver, or the like. The communication unit 909 allows device 900 to exchange information/data with other devices over a computer network such as the Internet and/or various telecommunication networks.

The processing unit 901 may be configured to perform various methods and processes described above, such as methods 200 and 600. For example, in at least one embodiment, methods 200 and 600 may be implemented as computer software programs that are tangibly embodied in the machine readable medium, such as storage unit 908. In at least one embodiment, part or all of the computer program may be loaded and/or installed on the device 900 via ROM 902 and/or the communication unit 909. When a computer program is loaded into RAM 903 and executed by CPU 901, one or more steps of the methods 200 and 600 described above may be performed. Alternatively, in other embodiments, the CPU 901 can be configured to perform the methods 200 and/or 600 by any other suitable means (e.g., by means of firmware).

It should be understood that, the acquisition entities 110 and 120 (such as vehicles or robots, etc.) in accordance with an embodiment of the present disclosure may include the device 900 illustrated in FIG. 9.

The functions described above may be performed, at least in part, by one or more hardware logic components. For example, without any limitation, the exemplary type of the hardware logic component may include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the present disclosure may be written in any combination of one or more programming languages. The program code may be provided to a general-purpose computer, a special purpose computer or a processor or controller of other programmable data processing devices, such that the program code, when executed by the processor or controller, causes the functions/operations specified in the flowcharts and/or block diagrams to be implemented. The program code may be executed entirely on a machine, partially on a machine, partially on the machine as a separate package, partially on a remote machine, or entirely on a remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or Flash memory), an optical fiber, a compact disk-only memory (CD-ROM), an optical storage device, a magnetic storage device, or any suitable combination of the above.

In addition, although the operations are depicted in a particular order, it should be understood that such operations are required to be performed in the particular order shown or in the order, or that all illustrated operations should be performed to achieve the desired results. Multitasking and parallel processing may be advantageous in certain circumstances. Likewise, although several specific implementation details are included in the above discussion, these should not be construed as restrictions on the scope of the present disclosure. Certain features described in the context of individual embodiments may also be implemented in combination in a single implementation. Instead, various features described in the context of a single implementation may also be implemented in a plurality of implementations, either individually or in any suitable sub-combination.

Although the present disclosure has been described in language specific to structural features and/or methodological acts, it is understood that the subject matter defined in the appended claims is not limited to the specific features or acts described. Instead, the specific features and acts described above are merely exemplary forms of implementing the claims.

What is claimed is:

1. A method for generating an electronic map, comprising:
   obtaining a first point cloud sequence and a second point cloud sequence for a preset region;
   generating a first grid map for the first point cloud sequence and a second grid map for the second point cloud sequence, wherein a grid in each of the first grid map and the second grid map at least comprises reflection value information of a point cloud; and
   optimizing the first point cloud sequence based on the first grid map and the second grid map.

2. The method according to claim 1, wherein obtaining the first point cloud sequence and the second point cloud sequence for the preset region comprises:
   obtaining the first point cloud sequence and the second point cloud sequence when a signal of a geolocation system is weak or missing.

3. The method according to claim 1, wherein generating the first grid map for the first point cloud sequence comprises:
   projecting the first point cloud sequence into a plurality of grids in the first grid map;
   aggregating point cloud data in each of the plurality of grids; and
   storing an attribute of each of the plurality of grids in the first grid map, wherein the attribute comprises: a number of laser points, a mean value and variance of reflection values of the laser points, a mean value and variance of height values of the laser points.

4. The method according to claim 1, wherein optimizing the first point cloud sequence comprises:
performing a geometric transformation within a predetermined range on the first grid map, wherein the geometric transformation comprises at least one of translation and rotation;
determining a geometric transformation magnitude when a matching probability between the transformed first grid map and the second grid map is maximized as a first pose difference;
optimizing the first point cloud sequence based on the first pose difference.

5. The method according to claim 4, wherein performing the geometric transformation within the predetermined range on the first grid map comprises:
performing a first geometric transformation on the first grid map in a first transformation unit in a first range;
performing a second geometric transformation on the first grid map in a second transformation unit in a second range, wherein the second range is less than the first range, and the second transformation unit is less than the first transformation unit.

6. The method according to claim 4, wherein determining the first pose difference comprises:
determining a joint matching probability of a reflection value and a height value between the transformed first grid map and the second grid map.

7. The method according to claim 4, wherein optimizing the first point cloud sequence comprises:
generating a third grid map based on a third point cloud sequence for the preset region;
determining a second pose difference between the second grid map and the third grid map; and
determining a third pose difference between the third grid map and the first grid map.

8. The method according to claim 7, wherein optimizing the first point cloud sequence comprises:
determining a first pose of the first grid map, a second pose of the second grid map and a third pose of the third grid map based on the first pose difference, the second pose difference and the third pose difference; and
adjusting the first point cloud sequence based on the first pose.

9. A device for generating an electronic map, comprising:
one or more processors; and
a memory, configured to store one or more programs;
wherein when the one or more programs are executed by the one or more processors, causes the one or more processors to:
obtain a first point cloud sequence and a second point cloud sequence for a preset region;
generate a first grid map for the first point cloud sequence and a second grid map for the second point cloud sequence, wherein a grid in each of the first grid map and the second grid map at least comprises reflection value information of a point cloud; and
optimize the first point cloud sequence based on the first grid map and the second grid map.

10. The device according to claim 9, wherein the one or more processors are further configured to:
obtain the first point cloud sequence and the second point cloud sequence when a signal of a geolocation system is weak or missing.

11. The device according to claim 9, wherein the one or more processors are further configured to:
project the first point cloud sequence into a plurality of grids in the first grid map;
aggregate point cloud data in each of the plurality of grids; and
store an attribute of each of the plurality of grids in the first grid map, wherein the attribute comprises: a number of laser points, a mean value and variance of reflection values of the laser points, a mean value and variance of height values of the laser points.

12. The device according to claim 9, wherein the one or more processors are further configured to:
perform a geometric transformation within a predetermined range on the first grid map, wherein the geometric transformation comprises at least one of translation and rotation;
determine a geometric transformation magnitude when a matching probability between the transformed first grid map and the second grid map is maximized as a first pose difference;
optimize the first point cloud sequence based on the first pose difference.

13. The device according to claim 12, wherein the one or more processors are further configured to:
perform a first geometric transformation on the first grid map in a first transformation unit in a first range;
perform a second geometric transformation on the first grid map in a second transformation unit in a second range, wherein the second range is less than the first range, and the second transformation unit is less than the first transformation unit.

14. The device according to claim 12, wherein the one or more processors are further configured to:
determine a joint matching probability of a reflection value and a height value between the transformed first grid map and the second grid map.

15. The device according to claim 12, wherein the one or more processors are further configured to:
generate a third grid map based on a third point cloud sequence for the preset region;
determine a second pose difference between the second grid map and the third grid map; and
determine a third pose difference between the third grid map and the first grid map.

16. The device according to claim 15, wherein the one or more processors are further configured to:
determine a first pose of the first grid map, a second pose of the second grid map and a third pose of the third grid map based on the first pose difference, the second pose difference and the third pose difference; and
adjust the first point cloud sequence based on the first pose.

17. A non-transitory computer readable storage medium having stored thereon computer programs that, when executed by a processor, causes a method for generating an electronic map to be implemented, the method comprising:
obtaining a first point cloud sequence and a second point cloud sequence for a preset region;
generating a first grid map for the first point cloud sequence and a second grid map for the second point cloud sequence, wherein a grid in each of the first grid map and the second grid map at least comprises reflection value information of a point cloud; and
optimizing the first point cloud sequence based on the first grid map and the second grid map.

* * * * *